(12) United States Patent
Vimpari

(10) Patent No.: US 6,826,170 B1
(45) Date of Patent: Nov. 30, 2004

(54) METHOD FOR FORMING A DATA TRANSFER CONNECTION, TERMINAL EQUIPMENT AND A DATA TRANSFER SYSTEM

(75) Inventor: Markku Vimpari, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 1221 days.

(21) Appl. No.: 08/861,213

(22) Filed: May 21, 1997

(30) Foreign Application Priority Data

May 24, 1996 (FI) .................................................. 962199

(51) Int. Cl.⁷ ............................................. H04B 7/212
(52) U.S. Cl. ........................ 370/347; 370/337; 455/557
(58) Field of Search ................................ 370/328, 329, 370/330, 336, 337, 345, 347; 455/550, 555, 556, 557

(56) References Cited

U.S. PATENT DOCUMENTS

| | | | |
|---|---|---|---|
| 4,658,096 A | | 4/1987 | West, Jr. et al. |
| 4,775,997 A | | 10/1988 | West, Jr. et al. |
| 4,922,517 A | | 5/1990 | West, Jr. et al. |
| 5,117,450 A | | 5/1992 | Joglekar et al. |
| 5,467,398 A | * | 11/1995 | Pierce et al. .................. 380/44 |
| 5,533,027 A | * | 7/1996 | Akerberg et al. ........... 370/347 |
| 5,748,610 A | * | 5/1998 | Bustamante et al. ........ 370/208 |
| 5,819,177 A | * | 10/1998 | Vucetic et al. .............. 455/425 |
| 5,862,469 A | * | 1/1999 | Antonello et al. .......... 455/405 |

OTHER PUBLICATIONS

European Telecommunication Standards Institute (ETSI), May 1995, "European Digital Cellular Telecommunications System (Phase 2); Mobile Radio Interface Layer 3 Specification (GSM 04.08)".

Mouly, Pautet, "The GSM Systems for Mobile Communications", 1992, pp. 530–543.

* cited by examiner

Primary Examiner—Douglas Olms
Assistant Examiner—Bob A. Phunkulh
(74) Attorney, Agent, or Firm—Perman & Green, LLP

(57) ABSTRACT

The object of the invention is a method for controlling a data transfer connection, terminal equipment and a data transfer system wherein at least two subscriber stations are connected to one subscriber connection of the data transfer system. The invention can be preferably applied, for example, in Wireless Local Loop networks, i.e. in WLL systems. One idea of the invention is that information relating to subscriber stations which have been connected to the subscriber connection is stored in the data transfer system and this data is exploited in switching an incoming connection to the correct subscriber station and in setting the data transfer procedure of an outgoing connection to correspond to the subscriber station being used. Terminal equipment according to the invention comprises preferably switches (416, 417) which are controllable by the processor of the baseband part (412) for switching the connection to the correct subscriber station. By means of the invention, it is possible to implement several subscriber station connections with WLL terminal equipment which has only one baseband part (412) and RF part (413). Additionally, forming of the connection is possible without unnecessary delays or manual connection. By means of the invention, also unnecessary forming of an incoming speech connection can be avoided, if there is no person present to answer the call.

17 Claims, 4 Drawing Sheets

METHOD FOR FORMING A DATA TRANSFER CONNECTION, TERMINAL EQUIPMENT AND A DATA TRANSFER SYSTEM

The object of the invention is a method for forming a data transfer connection between a data transfer system and a subscriber device, terminal equipment and a data transfer system wherein at least two subscriber devices are connected to one subscriber connection of the data transfer system. The invention can be preferably applied, for example, in Wireless Local Loop networks, i.e. WLL networks.

WLL systems are a preferable way to extend the public switched telephone network to new subscribers since the extension can be carried out without having to provide cabling for each subscriber separately. In wireless local loop networks, i.e. WLL networks, the terminal equipment which are in use comprise a telephone or some other subscriber station which is suitable for connecting to the public switched telephone network and a tranceiver unit connected to it. The adaptation between the subscriber station and the tranceiver unit is executed by a line adapter. The tranceiver unit is usually connected by radio to a cellular service, which could be, for example, to a GSM system. It is often desirable to use one subscriber connection both for speech transmission and for transmission of character based data, such as telefaxes. There are, however, problems associated with this, especially in WLL systems, and they will be described more closely in the following.

In the following, the prior art is presented by describing first in some detail WLL terminal equipment according to the prior art and its connection to the data transfer system and by describing subsequently a solution according to the prior art for connecting two subscriber stations to the WLL data transfer system.

FIG. 1 shows a prior known solution for the implementation of a WLL terminal equipment. The WLL terminal equipment 100 is connected to a cellular system which comprises base stations 151 for transferring data by radio via an antenna 150 to terminal equipment. The base stations are connected to base station controllers 152 which are further connected to a switching center 153. The switching center 153 is linked to the public switched telephone network PSTN. Also a home location register HLR is connected to the switching center. The data concerning the subscribers of the system is stored to this register.

Terminal equipment 100 comprises an antenna 104 for transmitting and receiving a radio frequency signal. The received signal is amplified and demodulated into a baseband signal in an RF part 113 and the baseband signal is processed in a signal processing block 114 of the baseband part 110. Similarly, the transmitted baseband signal is processed for transmission according to specifications of the cellular system in block 114 and modulated into an RF frequency and amplified in the RF part 113 to be fed to the antenna 104.

The signal processing and the RF part are controlled by a processor 111 to which a memory 112 is connected for storing programs and parameters. A regulator 115 forms the supply voltages for the baseband part and for the RF part.

A line adapter part 130 comprises an audio part 134 for adapting the audio signal of the baseband part 110 and the audio signal of the telephone set to each other. A DTMF detector 133 detects dialling signals which are transferred in the audio line and transmits them to the processor 131 of the line adapter part. A HOOK detector 135 detects the state of the hook switch of the telephone device and transmits the status mode data to the processor 131 and to a tone generator 136. The tone generator 136 forms audio signals to the telephone on the basis of the status mode data of the connection which have been transmitted by the cellular system. A ringing generator 137 forms a high voltage ringing signal (for example, 45 V AC) for the ringing function of the telephone set. Voltage between lines/loop current (for example, 40 V DC) is formed in a DC regulator 138 to meet the specifications of the telephone set from the high voltage formed by a DC/DC converter block. The processor 131 controls the blocks of the line adapter and it is connected to the processor 111 of the mobile station part 110, for example, through serial bus. The program of the processor and the parameters connected to the functions of the line adapter and the status mode data of the connection are stored into a memory 132 connected to the processor 131.

The above presented solution according to the prior art has been described in more detail in the patent specification U.S. Pat. No. 5,117,450 (WO 9014729). Other WLL systems according to the prior art have been described, for example, in the patent specifications U.S. Pat. Nos. 4,658,096, 4,775, 997 and 4,922,517.

It is often desirable to use one subscriber connection of the telephone both for speech transmission and for the transmission of character based data, such as telefaxes. The simplest method in this case is to connect in parallel a telephone set and, for example, a telefax to the same subscriber line. However, with respect to this arrangement the problem arises in the context of an incoming connection, since one does not know whether it is a phone call or a telefax transmission. In this case, one has to answer the phone and if it is concluded from the audio signals that it is a telefax transmission, the telephone receiver is set on-hook and the receiving function of the telefax is switched on. However, this demands that there is someone next to the telephone set monitoring all incoming connections. If the person is not present, the telefax has to be connected to an auto answer mode and thus only telefaxes can be transmitted to the subscriber connection. In this case, it is not possible to use, for example, a telephone answering machine parallel with the telefax. The telefax can also be used in an auto answer mode constantly but then, as an ordinary call is coming to the subscriber connection, the telefax feeds a disturbing audio signal to the line until the receiver notices that it is not a telefax transmission and receives the call by using the telephone.

To solve the above mentioned problem, two separate subscriber connections are often used, one for the telephone and the other for the telefax. FIG. 2 shows a prior known solution like this. A telephone 201 has been connected to the first WLL connection and a telefax 202 has been connected to the second WLL connection. For each connection there is a separate connection device 210, 220 which comprises an antenna 214, 224, an RF part 213, 223, a baseband part (BB) 212, 222, a line adapter (LA1, LA2) 211, 221 and an interface for connecting the subscriber station (INTERFACE 1, INTERFACE 2). However, the disadvantage of this solution is that the acquiring and upkeep of several subscriber connections leads to considerable costs.

The above mentioned disadvantages can be reduced by a prior known incoming call type recognition. The device answers the call automatically and receives the signal from the line for a maximum predetermined time. If it is a telefax transmission, the device detects the audio signal of a transmitting telefax and connects the line to the telefax. If, instead, during the predetermined time the device does not detect the audio signal of a telefax, it connects the line to the telephone. The problem with this kind of combination device is, however, that in the context of an ordinary call the device answers the incoming connection even though there is no one present to answer the call. In this case, connecting the line uses unnecessarily the capacity of the data transfer network and causes unnecessary costs to the caller. This is a special problem with the WLL connection since the capability of the WLL network to transmit connections in the communications channel is usually lower than the number of connections in the network in which case the forming of unnecessary connections may cause a network overload.

With the WLL network, there are also disadvantages associated with solutions according to the prior art that relate to outgoing connections. In this case, the WLL network has to recognize the type of the outgoing connection by waiting for a possible signal given by the telefax. This causes an extra delay in the forming of the connection. Particularly with long distance connections, when it may take a long time to form a connection in any case, this extra delay may exceed a time-out limit in the telefax. Exceeding time-out limit means that the telefax interprets the formation of the outgoing connection as having failed and closes the line.

The aim of the present invention is to devise a solution by means of which the above presented problems of the prior art can be avoided.

One idea of the invention is that information concerning subscriber stations, which have been connected to the subscriber connection, is stored in the data transfer system. This data is exploited for switching the incoming connection to the correct subscriber station and for setting the data transfer procedure of the outgoing connection quickly to correspond to the subscriber station being used.

Digital data transfer system is applied in the solution according to the invention to preferably allow one, on one hand, to exploit the possibility to refer to the subscriber indirectly by using the IMSI (International Mobile Subscriber Identity) identifier and, on the other hand, to exploit data concerning the parameters of the connection which is exchanged in the signalling between the terminal equipment and the data transfer system. In this case, the subscriber obtains for his/her use at least two connection identifiers, one of which can be considered as being for the telefax connection and one for the speech connection. Incoming connections are thus directed in the WLL terminal equipment to the telephone or to the telefax on the basis of the parameter information transferred in the signalling.

By means of the invention, it is possible to implement several subscriber station connections with WLL terminal equipment which has just one RF and baseband part in which case the costs of the purchase and upkeep of the subscriber connection can be reduced. In addition, it is possible to form a connection without unnecessary delay or requiring any manual operation. By means of the invention, also unnecessary formation of incoming speech connection can be avoided, if there is no person present to answer the call.

A method according to the invention for forming a connection between a data transfer system and a subscriber station wherein said subscriber station is one of at least two subscriber stations which are connected to the subscriber connection of the data transfer system, is characterized in that subscriber station information according to the subscriber connection and concerning subscriber stations connected to the subscriber connection is stored in the data transfer system, and the connection is formed depending on said subscriber station data.

Terminal equipment connected to a subscriber connection of a data transfer network according to the invention wherein the terminal equipment comprises interfaces for at least two subscriber stations, is characterized in that the terminal equipment comprises means for storing subscriber station information which is logically connected to the subscriber stations which have been connected to the terminal equipment and means for forming a connection between the subscriber station and the data transfer system depending on said subscriber station information.

A data transfer system according to the invention which comprises a subscriber connection to which at least two subscriber stations are connected, is characterized in that the data transfer system comprises the means for storing subscriber station information concerning subscriber stations which are connected to said subscriber connection and means for forming a connection between the data transfer system and a subscriber station which is connected to said subscriber connection depending on said subscriber station information.

Preferable embodiments according to the invention have been presented in dependent claims.

The invention is described in the following in greater detail by referring to the attached drawings in which FIG. 1 shows a block diagram of an arrangement according to the prior art for the implementation of terminal equipment and its connection to the data transfer system;

Figure 1:
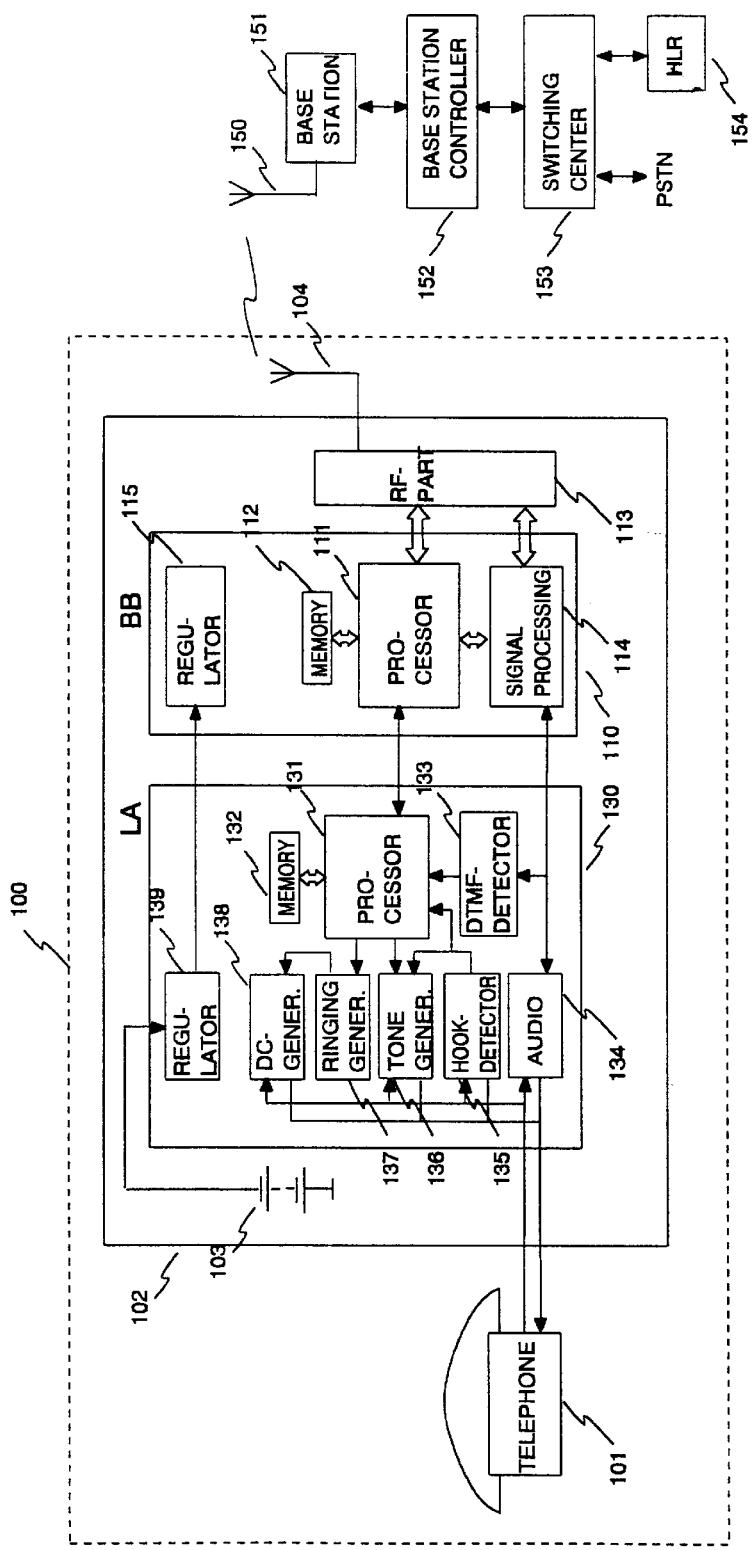
Figure 2:
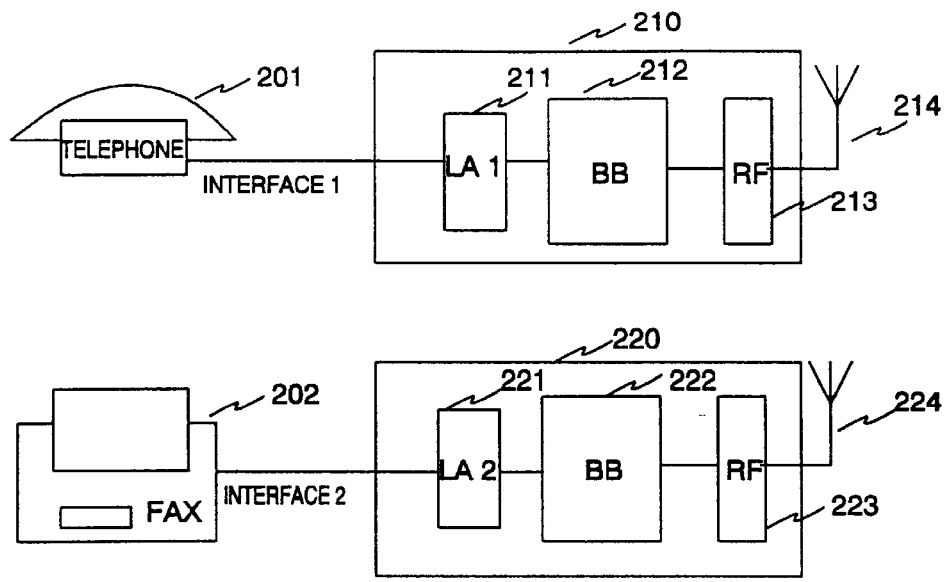
FIG. 2 shows a solution according to the prior art for connecting two subscriber stations to the WLL network by means of two subscriber connections.

FIGS. 1 and 2 have already been described above in the context of the description of the prior art. In the following, a method according to the invention is described first by means of FIG. 3. After this, terminal equipment and a data transfer system according to the invention are described by means of FIGS. 4 and 5. Finally, another embodiment of the invention in which simultaneous speech and data connection is possible, is described by referring to FIGS. 6 and 7.

In the following, the invention is described as related to the GSM system. The GSM system has been described in more detail, for example, in the standards of the GSM system which have been published by the European Telecommunication Standards Institute (ETSI) and in the publication Mouly, Pautet, The GSM System for Mobile Communications, 1992.

Figure 3:
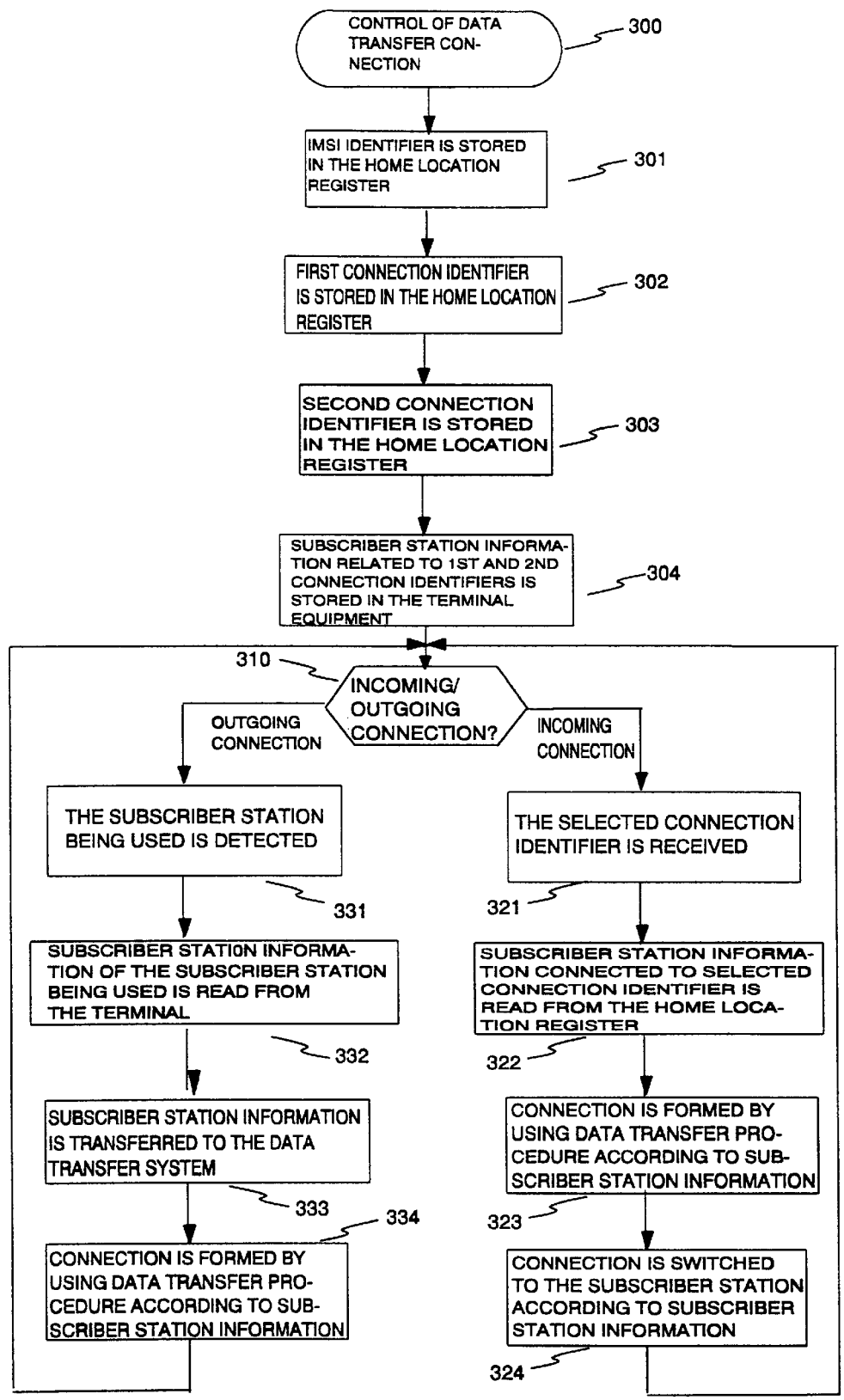
FIG. 3 shows a method according to the invention for forming a data transfer connection.

FIG. 3 shows a method according to the invention for controlling data transfer connection 300. As a new connection is created to the data transfer system, initializing functions of the connection shown by blocks 301–304 are performed in this context. Thus the identification data IMSI of a subscriber is stored in the home location register HLR of the data transfer system which contains information of the subscribers of the system, block 301. In this context, the first connection identifier is stored in the home location register and it is used in the context of the first subscriber station, such as a telephone, connected to the subscriber connection, block 302. Similarly, a second connection identifier is stored in the home location register and it is used in the context of a second subscriber station, such as a telefax connected to said subscriber connection, block 303. In this way, logically connected to the IMSI identifier of the subscriber, a distinct connection identifier is stored for each subscriber station which has been connected to the subscriber connection. In the context of the storing of the connection identifiers, also information is stored concerning what type a subscriber station connected to each connection identifier is, block 304. This information is used for the selection of data transfer procedure in the forming of a connection. In order to have the information available in the forming of both outgoing and incoming connections, the information is stored both in the home location register and in the terminal equipment. The simplest way the information can be stored in the home location register is that, for example, for speech connection and telefax connection, a distinct memory location of connection identifier has been reserved for each IMSI identifier.

The use of the subscriber station data in the forming of a connection depends on whether it is an incoming or an outgoing connection, block 310. In a situation of an incoming connection, the data transfer system receives the selected connection identifier, block 321, after which the subscriber station information related to the received connection identifier is read from the home location register, block 322. Thereafter, a connection is formed to the subscriber connection by means of the IMSI identifier corresponding to the subscriber identifier by using a data transfer procedure according to the subscriber station information concerned, block 323. Finally, a connection is switched on to the subscriber station according to the subscriber station information of the subscriber connection, block 324.

In a situation of an outgoing connection, the terminal equipment detects the subscriber station used for initiating the connection, block 331. The detection can be executed, for example, on the basis of a HOOK signal. After this, the subscriber station information that is related to the subscriber station in use is read, block 332, and the information is transferred to the data transfer system, block 333. Finally, a connection between the subscriber station and the data transfer system is formed by using a data transfer procedure according to the subscriber station information, block 334.

The above presented method can be applied in a simple manner, for example, in the digital GSM system, since in that system the connection identifier of the user may vary according to the service used. In this case, identification data IMSI (International Mobile Subscriber Identity) in the SIM (Subscriber Identity Module) card which has been placed in the terminal equipment can be used only as a reference to the actual connection identifier which is visible to the final user. Thus, in the GSM system there may be a different connection identifier for an incoming data connection than for a speech connection. In this case, the switching center connects the different connection identifiers to the same IMSI number in a manner shown above, on the basis of desired service.

Figure 4:
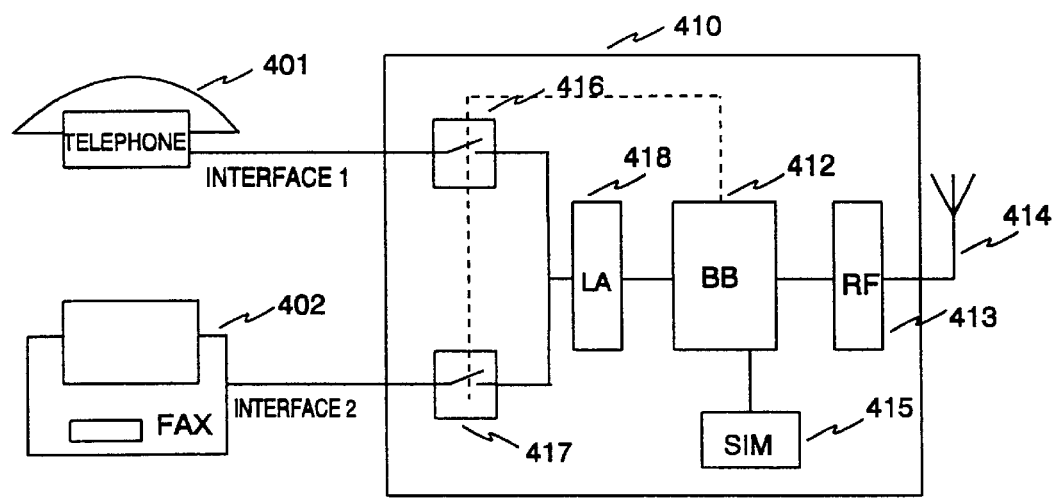
FIG. 4 shows a solution according to the invention for the implementation of WLL terminal equipment which has interfaces for two subscriber stations.

FIG. 4 shows terminal equipment according to the invention. Separate interfaces, for example, for a telephone 401 and for a telefax 402 have been implemented in such a way that two separate ports, INTERFACE 1 and INTERFACE 2, are connected to the line adapter (LA) 418 of the connection part 410. The line adapter is connected to one of the two connections by using controllable switches 416, 417. The switches are controlled by a processor of the baseband part (BB) 412 of the terminal equipment and this processor receives the subscriber station information from the data transfer system. Furthermore, information concerning subscriber stations which have been connected to interfaces 1 and 2 has been stored in the memory attached to the processor. In the terminal equipment according to FIG. 4, the line adapter has no processor of its own but the processor 412 of the baseband part controls also the operations of the line adapter. If the line adapter has its own processor, also that can control the switches 416, 417. Also a SIM card has been connected to the baseband part and, for example, the IMSI identifier of the subscriber has been stored to the SIM card. Furthermore, the terminal equipment comprises an RF part 413 and an antenna 414 for radio data transfer. In this context, the functions of the blocks of the terminal equipment according to FIG. 4 are not presented for those parts that correspond to the terminal equipment according to FIG. 1 which has been described in the context of the description of the prior art.

Figure 5:
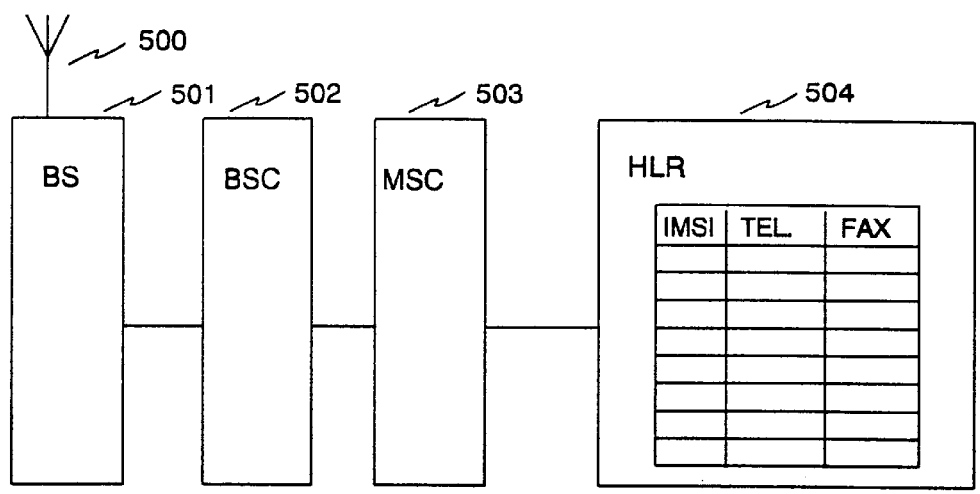
FIG. 5 shows a solution according to the invention for the implementation of a data transfer system.

FIG. 5 shows a data transfer system in which terminal equipment is connected to a mobile switching center MSC 503 via an antenna 500, a base station BS 501 and a base station controller BSC 502. Subscriber data which comprises, for example, the IMSI identifiers and the connection identifiers has been stored in the home location register HLR 504 which has been attached to the switching center. The figure shows one method for storing IMSI and connection identifiers in which for each IMSI identifier, a memory location has been reserved for the connection identifier of the telephone and the telefax.

Figure 6:
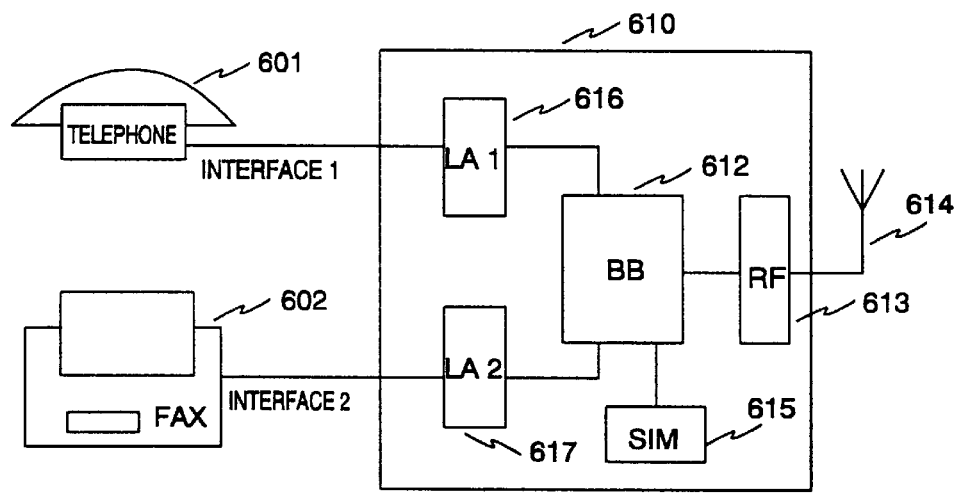
FIG. 6 shows another solution according to the invention for the implementation of terminal equipment which comprises two interfaces for subscriber stations and FIG. 7 shows a solution according to the invention for the arrangement of speech and data connection simultaneously within GSM data transfer frames.

FIG. 6 shows an alternative solution according to the invention in which separate line adapters 616, 617 have been used which are controlled by the processor of the baseband part 612. The advantage of the solution is that it permits the subscriber to use the device simultaneously for speech connection and data connection. In this case, the capacity of the baseband part 612 is designed for the simultaneous coding of speech and data and for communication on two time slots of the radio channel. Additionally, the use of simultaneous speech and telefax connection demands a greater settling speed of frequency from the synthesizer of the RF part 613. For other parts, the solution shown in FIG. 6 corresponds to the solution according to FIG. 4.

Figure 7:
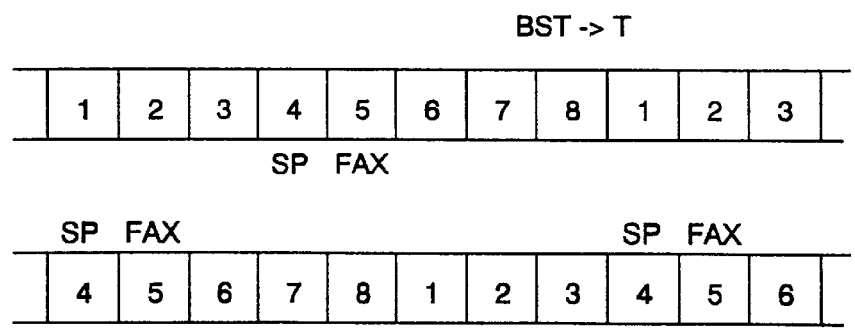

FIG. 7 shows a solution for reserving time slots on the radio channel when simultaneous speech and telefax connections are used. The TDMA (Time Division Multiple Access) frame which is used for data transfer, consists of eight time slots 1 . . . 8, of which the time slot 4 has been reserved for speech (SP) and the time slot 5 has been reserved for telefax transfer (FAX). FIG. 7 shows both the time slots transferred from the base station BST to the terminal equipment T and the time slots transferred from the terminal equipment T to the base station BST for visualizing the relative timing of data transfer frames. As can be noticed in FIG. 7, time slots 4 and 5 which are transferred in opposite directions are nonsimultaneous, which is preferable for the implementation of the terminal equipment so that the transmitting and the receiving can be executed nonsimultaneously. For example, in the GSM system the transmitting and the receiving occur in different frequency bands. To allow also the synthesizer of the RF part of the terminal equipment as long a changing time of frequency as possible for the setting of transmitting and receiving frequency, it is preferable to use sequential time slots for the speech and telefax transfer.

Some embodiments of the solution according to the invention have been presented above. Naturally the principle according to the invention can be modified within the frame of the scope of the claims, for example, by modification of the details of the implementation and ranges of use.

It is to be noted particularly that the application of the invention is not restricted to the GSM system presented as an example but it can be applied also in the context of other data transfer systems. In the embodiments described above, a telephone and a telefax have been presented as subscriber stations but subscriber stations may naturally be also other communication means. Similarly, the number of subscriber stations and interfaces can also be greater than two. Additionally, more subscriber stations can be connected parallel to one interface of the terminal equipment when necessary.

What is claimed is:

1. A method for forming a connection between a WLL (Wireless Local Loop) data transfer system and a subscriber station, wherein the subscriber station is on of at least two subscriber stations connected to a terminal equipment, and a radio connection is formed between the terminal equipment and the data transfer system for said connection, and wherein subscriber station information concerning the subscriber stations connected to the terminal equipment is stored, and a data transfer procedure of the radio connection between the terminal equipment and the data transfer system is selected on the basis of said subscriber station information, and wherein for forming the radio connection between the terminal equipment and the data transfer system, at least two connection identifiers are related logically to the terminal equipment and said connection identifiers are related logically to subscriber stations connected to said terminal equipment.

2. A method according to claim 1, wherein for forming an incoming call or transmission to the subscriber connection a selected connection identifier is received which is related logically to the subscriber station to which it is desired to make the connection, and a connection is formed to the subscriber station which is logically related to the connection identifier received from the data transfer system.

3. A method according to claim 2, wherein the data transfer procedure of the incoming connection is selected depending on which subscriber station is related to the selected connection identifier.

4. A method according to claim 1, wherein for forming an outgoing call or transmission from the subscriber connection it is detected from which subscriber station connected to the subscriber connection the outgoing connection is desired to be formed, information of the subscriber station which is connected to the subscriber connection and from which the outgoing connection is desired to be formed is transferred to the data transfer system, and the outgoing connection is formed and data transfer procedure is selected on the basis of said information.

5. A method according to claim 1, wherein a simultaneous connection is formed from the data transfer system to at least two subscriber stations which are connected to the subscriber connection.

6. A method according to claim 5, wherein data transfer between the terminal equipment and the data transfer system is executed within data transfer frames according to time division multiple access (TDMA) in which case for said connections which have been formed to at least two subscriber stations, a distinct time slot of the data transfer frame is reserved.

7. A method according to claim 6, wherein said reserved time slots are the sequential time slots of the data transfer frame.

8. A method according to claim 1, wherein said data transfer system further comprises a GSM system.

9. Terminal equipment connected to a subscriber connection of a WLL data transfer system, which terminal equipment comprises interfaces for at least two subscriber stations and means for forming a radio connection between the terminal equipment and the data transfer system, and wherein the terminal equipment further comprises means for storing subscriber station information which is related logically to the subscriber stations connected to the terminal equipment, means for forming the radio connection between the terminal equipment and the data transfer system on the basis of said subscriber station information, and means for logically relating at least two connection identifiers to the terminal equipment and to the subscriber stations.

10. Terminal equipment according to claim 9, further comprising means for receiving subscriber station data which is logically connected to the subscriber stations to the terminal equipment from the data transfer system, and means for connecting the incoming connection to the subscriber station connected to the terminal equipment depending on the received subscriber station data.

11. Terminal equipment according to claim 9, further comprising means to detect second subscriber station information concerning from which subscriber station connected to the terminal equipment the outgoing connection is desired to be formed, means for storing the second subscriber station information, and means for transferring said second subscriber station information to the data transfer system for selecting a data transfer procedure of the outgoing connection on the basis of said second subscriber station information.

12. Terminal equipment according to claim 9, further comprising means for forming a simultaneous connection between at least two subscriber stations and the data transfer system.

13. A terminal equipment according to claim 9, wherein said data transfer system further comprises a GSM system.

14. A WLL data transfer system which comprises a subscriber connection with a terminal equipment to which at least two subscriber stations are connected, wherein the data transfer system comprises means for storing subscriber station information concerning subscriber stations connected to the terminal equipment of the subscriber connection, means for forming a radio connection between the data transfer system and the terminal equipment, and means for selecting the data transfer procedure of the radio connection on the basis of said subscriber station information, and means for logically relating at least two connection identifiers to the terminal equipment and to the subscriber stations.

15. A data transfer system according to claim 14, further comprising means for transferring said subscriber station information between the terminal equipment connected to the subscriber connection and the data transfer system.

16. A data transfer system according to claim 14, further comprising means for forming a simultaneous connection between the data transfer system and at least two subscriber stations connected to the subscriber connection.

17. A data transfer system according to claim 14, wherein said data transfer system further comprises a GSM system.

* * * * *